US011915676B2

(12) United States Patent
Boyd

(10) Patent No.: US 11,915,676 B2
(45) Date of Patent: Feb. 27, 2024

(54) ROTATING MALLET ASSEMBLY

(71) Applicant: Craig Boyd, Naples, TX (US)

(72) Inventor: Craig Boyd, Naples, TX (US)

(*) Notice: Subject to any disclaimer, the term of this patent is extended or adjusted under 35 U.S.C. 154(b) by 304 days.

(21) Appl. No.: 17/474,603

(22) Filed: Sep. 14, 2021

(65) Prior Publication Data

US 2023/0083439 A1    Mar. 16, 2023

(51) Int. Cl.
*G10D 13/12* (2020.01)
*G10K 1/064* (2006.01)
*H02J 7/00* (2006.01)

(52) U.S. Cl.
CPC ............ *G10K 1/064* (2013.01); *H02J 7/0042* (2013.01)

(58) Field of Classification Search
CPC ....... G10K 1/064; G10K 1/065; H02J 7/0042; G10D 13/00; G10D 13/12
See application file for complete search history.

(56) References Cited

U.S. PATENT DOCUMENTS 7,084,743 B2    8/2006   Petruzzi
10,839,783 B2 * 11/2020  Becker ................... G10G 5/005
2006/0249004 A1  11/2006  Bunker

FOREIGN PATENT DOCUMENTS

DE      102005007261      8/2006

* cited by examiner

*Primary Examiner* — Kimberly R Lockett

(57) ABSTRACT

A rotating mallet assembly for generating a continuous note from a standing bell includes a base, which is positionable on a substantially horizontal surface. A fastener engaged to an upper surface of the base can selectively engage a bottom of a standing bell so that the standing bell is removably engaged to the base. An arm is engaged to and extends from the base. A mallet is pivotally engaged to and extends from the arm distal from the base so that the mallet frictionally contacts a rim of the standing bell. A motor is engaged to the arm and is operationally engaged to the mallet. The motor is positioned to selectively rotate the mallet relative to the standing bell to excite continuous vibrations in the standing bell so that a continuous note is produced.

18 Claims, 6 Drawing Sheets

ROTATING MALLET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mallet assemblies and more particularly pertains to a new mallet assembly for generating a continuous note from a standing bell. The present invention discloses a mallet assembly comprising a rotating mallet, which contacts a rim of a standing bell to generate a continuous note.

(2) Description of Related Art Including Information Disclosed Under 37 CFR 1.97 and 1.98

The prior art relates to mallet assemblies. Prior art mallet assemblies for standing bells may comprise rotatable bases that can rotate standing bells relative to mallets, which rub and strike a rim of the standing bell. What is lacking in the prior art is a mallet assembly comprising a rotating mallet that contacts a rim of a standing bell to generate a continuous note.

BRIEF SUMMARY OF THE INVENTION

An embodiment of the disclosure meets the needs presented above by generally comprising a base, which is configured to be positioned on a substantially horizontal surface. A fastener is engaged to an upper surface of the base and is configured to selectively engage a bottom of a standing bell so that the standing bell is removably engaged to the base. An arm is engaged to and extends from the base. A mallet is pivotally engaged to and extends from the arm distal from the base so that the mallet frictionally contacts a rim of the standing bell. A motor is engaged to the arm and is operationally engaged to the mallet. The motor is positioned to selectively rotate the mallet relative to the standing bell. The mallet is configured to excite continuous vibrations in the standing bell so that a continuous note is produced.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
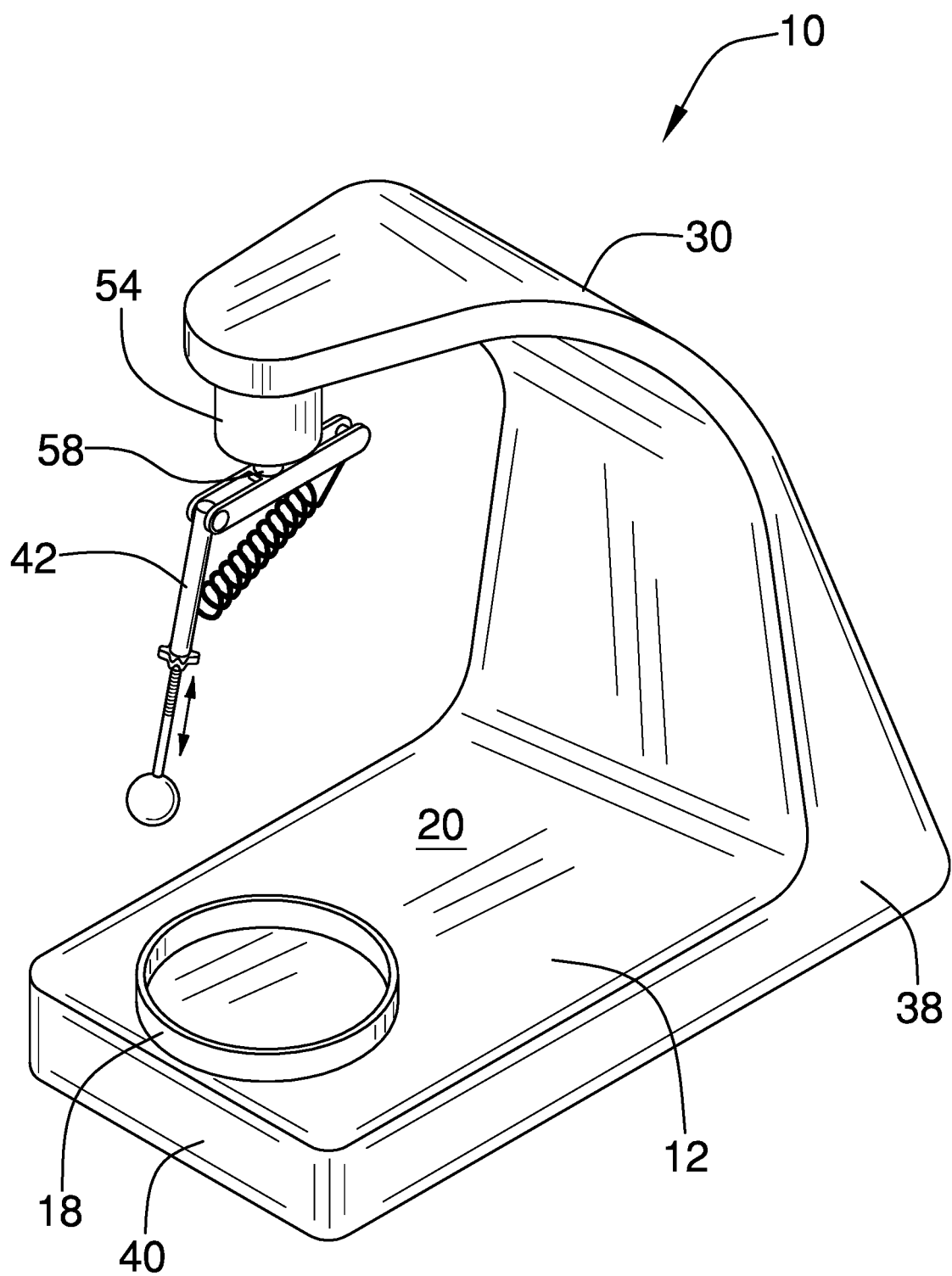
FIG. 1 is an isometric perspective view of a rotating mallet assembly according to an embodiment of the disclosure.

With reference now to the drawings, and in particular to FIGS. 1 through 9 thereof, a new mallet assembly embodying the principles and concepts of an embodiment of the disclosure and generally designated by the reference numeral 10 will be described.

As best illustrated in FIGS. 1 through 9, the rotating mallet assembly 10 generally comprises a base 12, which is configured to be positioned on a substantially horizontal surface. A plurality of feet 14 is engaged to a lower surface 16 of the base 12. The feet 14 are resiliently compressible and thus are configured to frictionally engage the substantially horizontal surface. The feet 14 comprise rubber, silicone, elastomer, or the like.

A fastener 18 is engaged to an upper surface 20 of the base 12 and is configured to selectively engage a bottom 22 of a standing bell 24 so that the standing bell 24 is removably engaged to the base 12. The fastener 18 may comprise a ring 26, which is configured to engage the bottom 22 of the standing bell 24. The present invention also anticipates the fastener 18 comprising other fastening means, such as, but not limited to, reversible adhesives, traction mats, and the like. The present invention anticipates the ring 26 comprising wood, rubber, silicone, elastomer, or the like.

Figure 9:
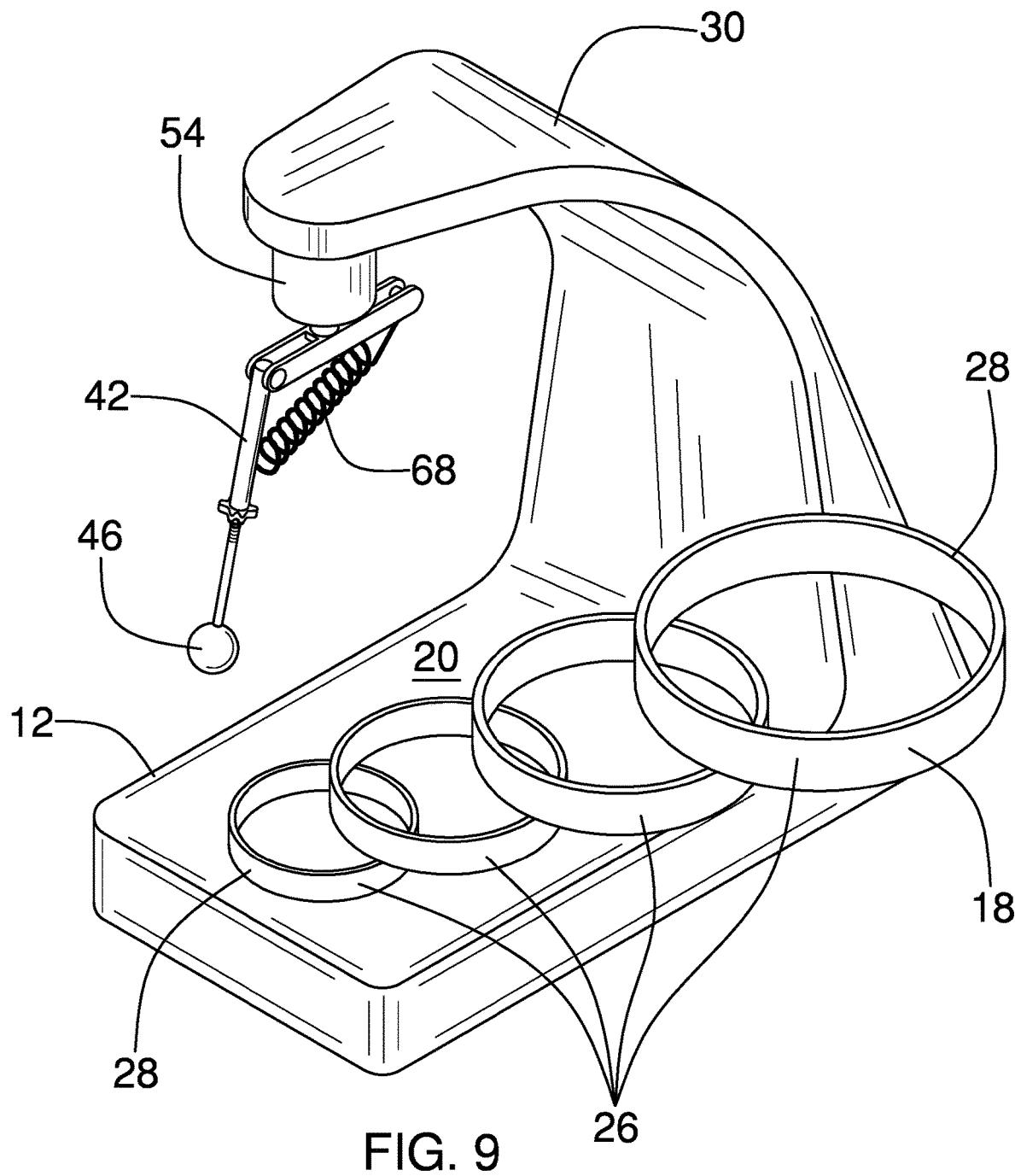
FIG. 9 is an isometric perspective view of an embodiment of the disclosure.

The ring 26 may be one of a plurality of rings 26, as shown in FIG. 9. Each ring 26 has a respective circumference 28 so that the plurality of rings 26 comprises rings 26 having a variety of circumferences 28. A respective ring 26 having a circumference 28 complementary to a bottom 22 of an associated standing bell 24 of a plurality of standing bells 24 is positionable upon the upper surface 20 of the base 12. The respective ring 26 is configured to engage the bottom 22 of the associated standing bell 24 to removably engage the associated standing bell 24 to the base 12.

An arm 30 is engaged to and extends from the base 12. The arm 30 may comprise a first segment 32, a second segment 34, and a third segment 36. The first segment 32 extends substantially perpendicularly from a rear 38 of the base 12. The second segment 34 is engaged to and extends arcuately from the first segment 32 distal from the base 12. The third segment 36 is engaged to the second segment 34 distal from the first segment 32 and extends toward a front 40 of the base 12. The third segment 36 is substantially parallel to the base 12.

Figure 3:
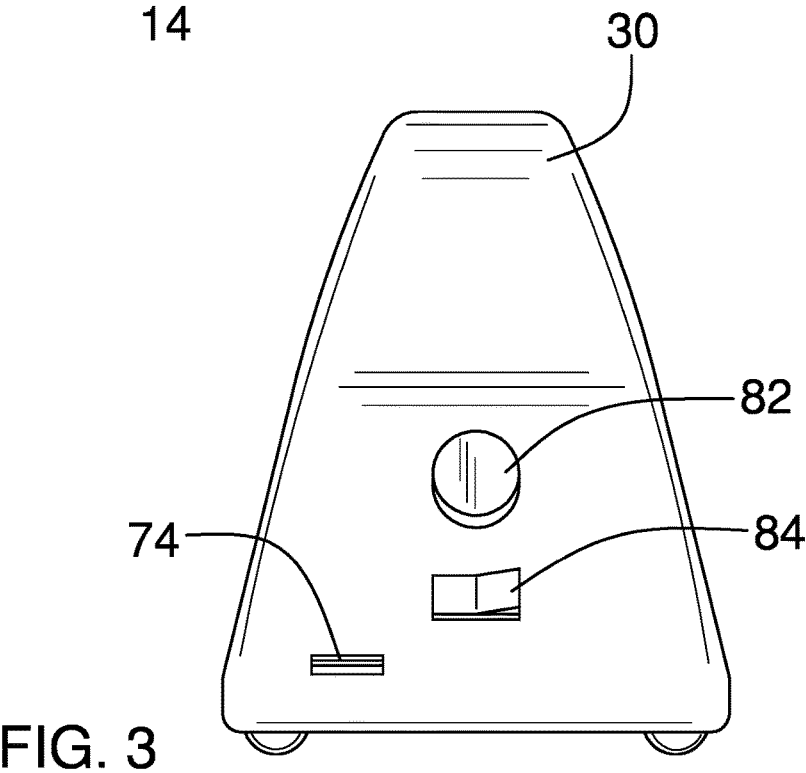
FIG. 3 is a rear view of an embodiment of the disclosure.
Figure 4:
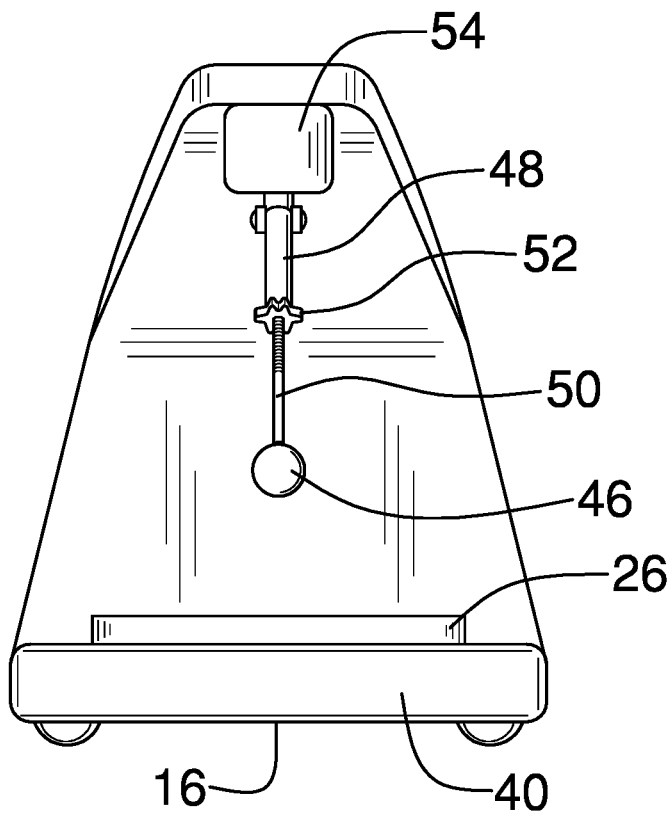
FIG. 4 is a front view of an embodiment of the disclosure.
Figure 5:
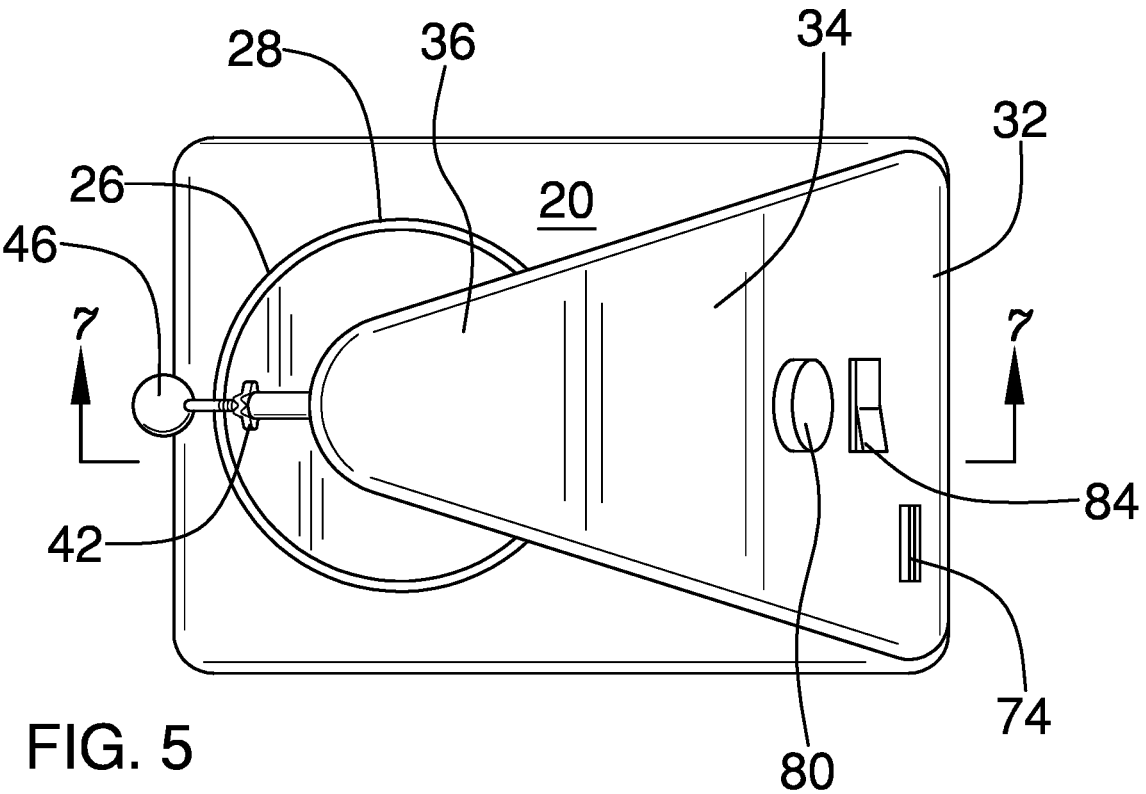
FIG. 5 is a top view of an embodiment of the disclosure.
Figure 6:
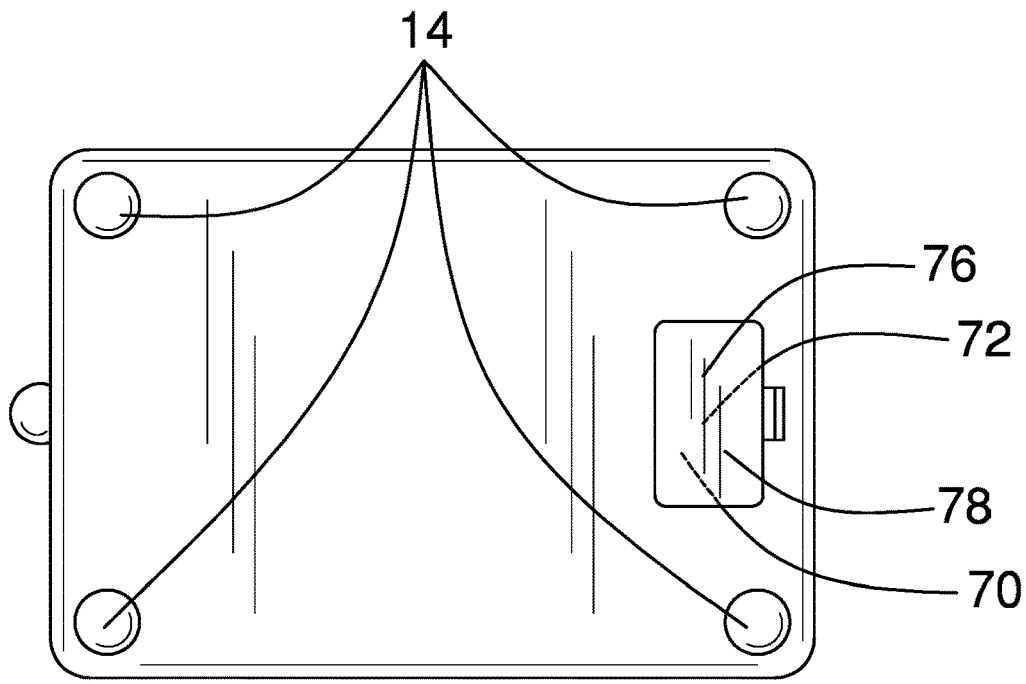
FIG. 6 is a bottom view of an embodiment of the disclosure.

The first segment 32 may taper from the base 12 so that the first segment 32 is dimensionally narrower proximate to the second segment 34, as shown in FIG. 3. The third segment 36 may taper from the second segment 34 so that the third segment 36 is dimensionally narrower distal from the second segment 34, as shown in FIG. 5. As will become apparent, many other configurations of the arm 30 are possible and are anticipated by the present invention.

A mallet 42 is pivotally engaged to and extends from the arm 30 distal from the base 12 so that the mallet 42 frictionally contacts a rim 44 of the standing bell 24. A ball 46 may be engaged to the mallet 42 distal from the arm 30. The ball 46 comprises wood and is configured to contact the standing bell 24.

The mallet 42 may comprise a first section 48 and second section 50. The first section 48 is proximate to the arm 30, tubular, and internally threaded. The second section 50 is distal from the arm 30 and externally threaded. The second section 50 is threadedly insertable into the first section 48 so that the mallet 42 is selectively length adjustable. A nut 52 is threadedly engaged to the second section 50. The nut 52 is positioned to be threaded along the second section 50 to abut the first section 48 to fixedly position the second section 50 relative to the first section 48.

A motor 54 is engaged to the arm 30 and is operationally engaged to the mallet 42. The motor 54 is positioned to selectively rotate the mallet 42 relative to the standing bell 24. The mallet 42 is configured to excite continuous vibrations in the standing bell 24 so that a continuous note is produced.

Figure 2:
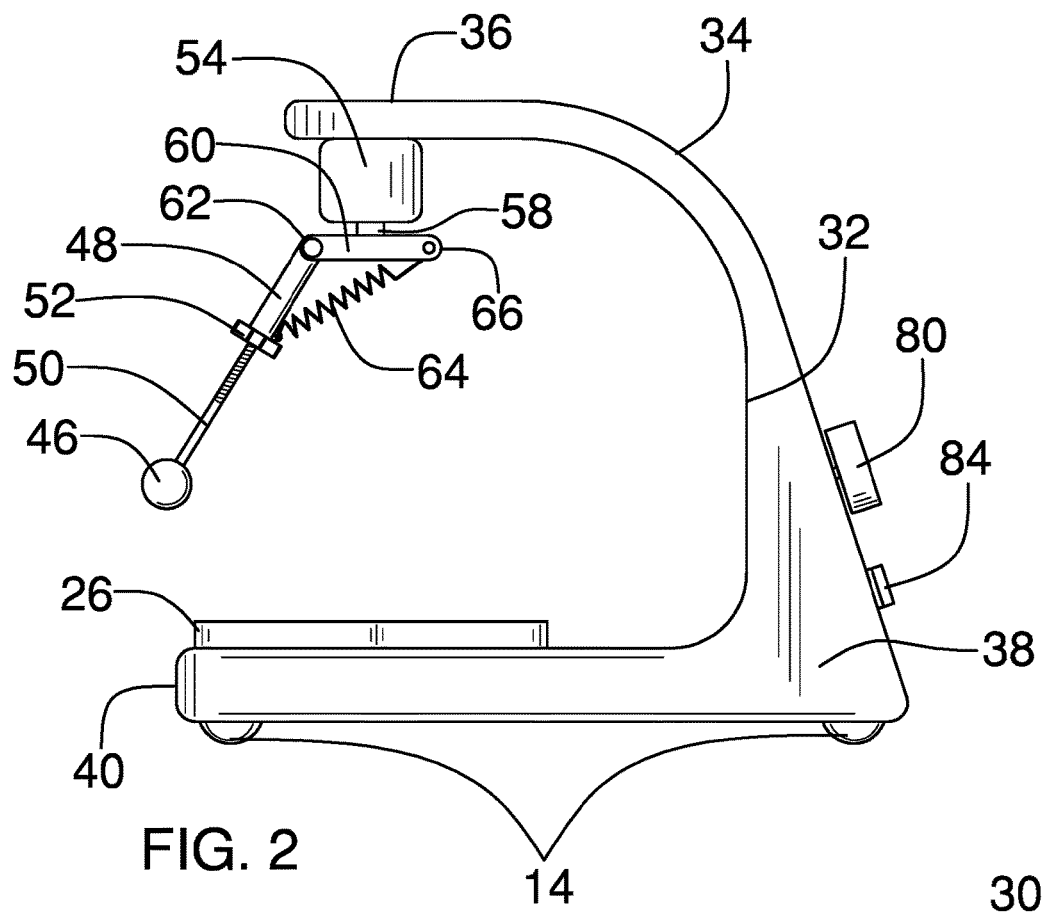
FIG. 2 is a side view of an embodiment of the disclosure.

The arm 30 and the base 12 define an interior space 56. The motor 54 is engaged to the arm 30 and is positioned in the interior space 56. A shaft 58 of the motor 54 extends from the arm 30 toward the base 12 so that the shaft 58 is axially positioned relative to the ring 26. A bar 60 is engaged to and extends bidirectionally from the shaft 58. The mallet 42 is hingedly engaged to a first end 62 of the bar 60. A tensioner 64 is engaged to and extends between the mallet 42 and a second end 66 of the bar 60. The tensioner 64 is positioned to bias the mallet 42 so that it frictionally contacts the rim 44 of the standing bell 24. The tensioner 64 may comprise a spring 68, as shown in FIG. 2, elastic band, or the like.

Figure 7:
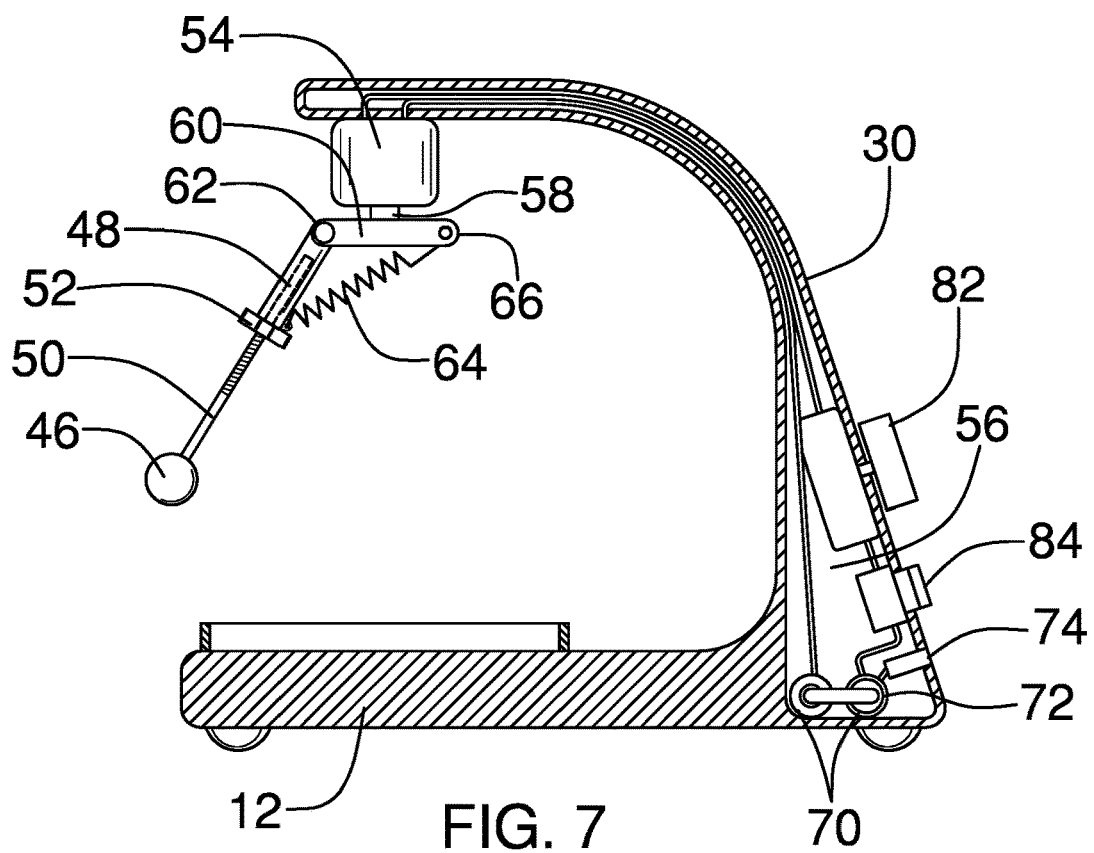
FIG. 7 is a cross-sectional view of an embodiment of the disclosure.
Figure 8:
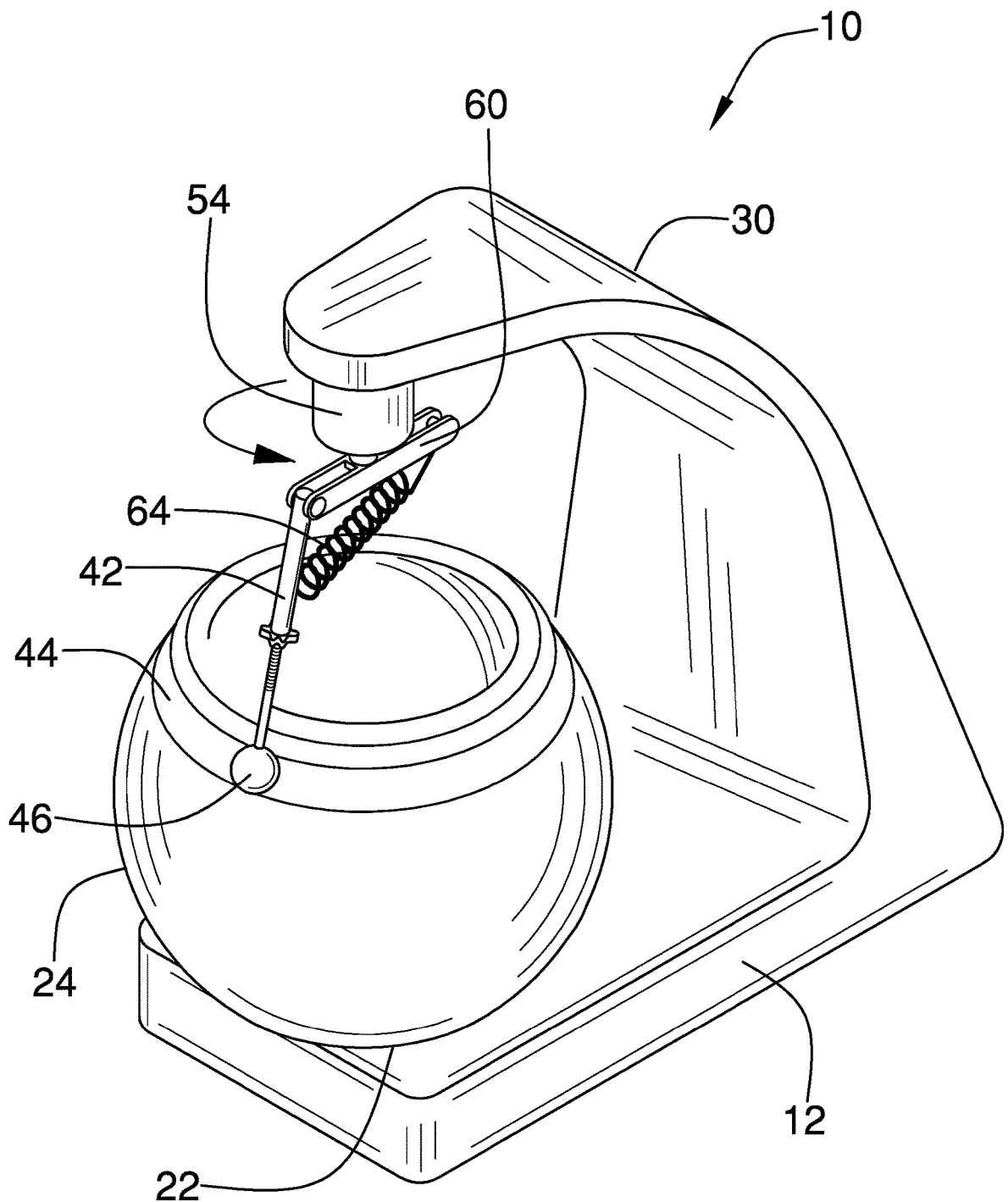
FIG. 8 is an in-use view of an embodiment of the disclosure.

A power module 70 is positioned in the interior space 56 and is engaged to one or both of the base 12 and the arm 30. The power module 70 is operationally engaged to the motor 54 and is positioned to selectively power the motor 54. The power module 70 may comprise a battery 72, as shown in FIG. 7, although the present invention anticipates the power module 70 comprising a power cord (not shown).

The battery 72 is rechargeable. A port 74 is engaged to the arm 30 or the base 12 and is operationally engaged to the battery 72. The port 74 is configured to engage a plug of a charging cord (not shown) to operationally engage the battery 72 to a source of electrical current to charge the battery 72 and to power the motor 54.

An aperture 76 is positioned in the base 12 or the arm 30 and is positioned proximate to the battery 72. The aperture 76 is configured to allow access to the interior space 56 for servicing of the battery 72. A panel 78 is selectively engageable to the base 12 or the arm 30 to close the aperture 76.

A controller 80 is engaged to the base 12 or the arm 30 and is operationally engaged to the motor 54 and the power module 70. The controller 80 is positioned to regulate a rotational speed of the mallet 42. The controller 80 may comprise a dial 82, as shown in FIG. 3, or other controlling means, such as, but not limited to, touch panels, push buttons, and the like.

A switch 84 is engaged to the base 12 or the arm 30 and is operationally engaged to the controller 80 and the power module 70. The switch 84 is configured to be selectively switched to operationally engage the controller 80 to the power module 70. The present invention also anticipates the controller 80 acting as the switch 84, for example, by having an off position.

In use, the base 12 is positioned on a substantially horizontal surface and a standing bell 24 is positioned on the ring 26 below the motor 54 so that the mallet 42 frictionally contacts a rim 44 of the standing bell 24. The motor 54 is engaged to rotate the mallet 42 around the rim 44 to produce a continuous note.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. A rotating mallet assembly comprising:
 a base configured for positioning on a substantially horizontal surface;
 a fastener engaged to an upper surface of the base and being configured for selectively engaging a bottom of a standing bell, such that, the standing bell is removably engaged to the base;
 an arm engaged to and extending from the base;
 a mallet pivotally engaged to and extending from the arm distal from the base, such that the mallet frictionally contacts a rim of the standing bell;

a motor engaged to the arm and being operationally engaged to the mallet, such that the motor is positioned for selectively rotating the mallet relative to the standing bell, wherein the mallet is configured for exciting continuous vibrations in the standing bell, such that a continuous note, is produced; and wherein the mallet comprises a first section proximate to the arm and a second section distal from the arm, the first section being tubular and internally threaded, the second section being externally threaded, such that the second section is threadedly insertable into the first section, such that the mallet is selectively length adjustable.

2. The rotating mallet, assembly of claim 1, further including a plurality of feet engaged to a lower surface of the base, the feet being resiliently compressible, wherein the feet are configured for frictionally engaging the substantially, horizontal surface.

3. The rotating mallet assembly of claim 2, wherein the feet comprise rubber, silicone, or elastomer.

4. The rotating mallet assembly of claim 1, wherein the fastener comprises a ring, wherein the ring is configured for engaging the bottom of the standing bell.

5. A rotating mallet assembly comprising:
a base configured for positioning on a substantially horizontal surface;
a fastener engaged to an upper surface of the base and being configured for selective engaging a bottom of a standing bell, such that the standing bell is removably engaged to the base;
an arm engaged to and extending from the base;
a mallet pivotally engaged to and extending from the arm distal from the base, such that the mallet frictionally contacts a rim of the standing bell;
a motor engaged to the arm and being operationally engaged to the mallet, such that the motor is positioned for selectively rotating the mallet relative to the standing bell, wherein the mallet is configured for exciting continuous vibrations in the standing bell, such that a continuous note is produced; and
wherein the fastener comprises a ring, wherein the ring is configured for engaging the bottom of the standing bell, the ring being one of a plurality of rings, each ring having a respective circumference, such that the plurality of rings comprises rings having a variety of circumferences, such that a respective ring having a circumference complementary to a bottom of an associated standing bell of a plurality of standing bells is positionable upon the upper surface of the base, wherein the respective ring is configured for engaging the bottom of the associated standing bell for removably engaging the associated standing bell to the base.

6. A rotating mallet assembly comprising:
a base configured for positioning on a substantially horizontal surface;
a fastener engaged to an upper surface of the base and being configured for selectively engaging a bottom of a standing bell, such that the standing bell is removably engaged to the base;
an arm engaged to and extending from the base;
a mallet pivotally engaged to and extending from the arm distal from the base, such that the mallet frictionally contacts a rim of the standing bell;
a motor engaged to the arm and being operationally engaged to the mallet, such that the motor is positioned for selectively rotating the mallet relative to the standing bell, wherein the mallet is configured for exciting continuous vibrations in the standing bell, such that a continuous note is produced; and
wherein the arm comprises:
a first segment extending substantially perpendicularly from a rear of the base,
a second segment engaged to and extending arcuately from the first segment distal from the base; and
a third segment engaged to the second segment distal from the first segment and extending toward a front of the base, such that the third segment is substantially parallel to the base.

7. The rotating mallet assembly of claim 6, wherein:
the first segment tapers from the base such that the first segment is dimensionally narrower proximate to the second segment; and
the third segment tapers from the second segment such that the third segment is dimensionally narrower distal from the second segment.

8. The rotating mallet assembly of claim 1, further including a nut threadedly engaged to the second section, such that the nut is positioned for threading along the second section to abut the first section for fixedly positioning the second section relative to the first section.

9. The rotating mallet assembly of claim 1, further including a ball engaged to the mallet distal from the arm, the ball comprising wood, wherein the ball is configured for contacting the standing bell.

10. A rotating mallet assembly comprising:
a base configured for positioning on a substantially horizontal surface;
a fastener engaged to an upper surface of the base and being configured for selectively engaging a bottom of a standing bell, such that the standing bell is removably engaged to the base;
an arm engaged to and extending from the base;
a mallet pivotally engaged to and extending from the arm distal from the base, such that the mallet frictionally contacts a rim of the standing bell;
a motor engaged to the arm and being operationally engaged to the mallet, such that the motor is positioned for selectively rotating the mallet relative to the standing bell, wherein the mallet is configured for exciting continuous vibrations in the standing bell, such that a continuous note is produced;
the arm and the base defining an interior space;
the motor being engaged to the arm and positioned in the interior space, such that a shaft of the motor extends from the arm toward the base, and such that the shaft is axially positioned relative to the ring;
a bar engaged to and extending bidirectionally from the shaft, the mallet being hingedly engaged to a first end of the bar; and
a tensioner engaged to and extending between the mallet and a second end of the bar, such that the tensioner is positioned for biasing the mallet for frictionally contacting the rim of the standing bell.

11. The rotating mallet assembly of claim 10, wherein the tensioner comprises a spring.

12. The rotating mallet assembly of claim 10, further including a power module positioned in the interior space and being engaged to one or both of the base and the arm, the power module being operationally engaged to the motor, such that the power module is positioned for selectively powering the motor.

13. The rotating mallet assembly of claim 12, wherein the power module comprises a battery.

14. The rotating mallet assembly of claim 13, further including:
   the battery being rechargeable; and
   a port engaged to the arm or the base and being operationally engaged to the battery, wherein the port is configured for engaging a plug of a charging cord for operationally engaging the battery to a source of electrical current for charging the battery and powering the motor.

15. The rotating mallet assembly of claim 13, further including:
   an aperture positioned in the base or the arm and being positioned proximate to the battery, wherein the aperture is configured for accessing the interior space for servicing the battery; and
   a panel selectively engageable to the base or the arm for closing the aperture.

16. The rotating mallet assembly of claim 12, further including a controller engaged to the base or the arm and being operationally engaged to the motor and the power module, such that the controller is positioned for regulating a rotational speed of the mallet.

17. The rotating mallet assembly of claim 16, further including a switch engaged to the base or the arm and being operationally engaged to the controller and the power module, wherein the switch is configured for being selectively s itched for operationally engaging the controller to the power module.

18. A rotating mallet assembly comprising:
   a base configured for positioning on a substantially horizontal surface;
   a plurality of feet engaged to a lower surface of the base, the feet being resiliently compressible, wherein the feet are configured for frictionally engaging the substantially horizontal surface, the feet comprising rubber, silicone, or elastomer;
   a fastener engaged to an upper surface of the base and being configured for selectively engaging a bottom of a standing bell, such that the standing bell is removably engaged to the base, the fastener comprising a ring, wherein the ring is configured for engaging the bottom of the standing bell, the ring being one of a plurality of rings, each ring having a respective circumference, such that the plurality of rings comprises rings having a variety of circumferences, such that a respective ring having a circumference complementary to a bottom of an associated standing bell of a plurality of standing bells is positionable upon the upper surface of the base, wherein the respective ring is configured for engaging the bottom of the associated standing bell for removably engaging the associated standing bell to the base;
   an arm engaged to and extending from the base, the arm and the base defining an interior space, the arm comprising:
      a first segment extending substantially perpendicularly from a rear of the base,
      a second segment engaged to and extending arcuately from the first segment distal from the base, the first segment tapering from the base such that the first segment is dimensionally narrower proximate to the second segment, and
      a third segment engaged to the second segment distal from the first segment and extending toward a front of the base, such that the third segment is substantially parallel to the base, the third segment tapering from the second segment such that the third segment is dimensionally narrower distal from the second segment;
   a mallet pivotally engaged to and extending from the arm distal from the base, such that the mallet frictionally contacts a rim of the standing bell, the mallet comprising a first section proximate to the arm and a second section distal from the arm, the first section being tubular and internally threaded, the second section being externally threaded, such that the second section is threadedly insertable into the first section, such that the mallet is selectively length adjustable;
   a nut threadedly engaged to the second section, such that the nut is positioned for threading along the second section to abut the first section for fixedly, positioning the second section relative to the first section;
   a ball engaged to the mallet distal from the arm, the ball comprising wood, wherein the ball is configured for contacting the standing bell;
   a motor engaged to the arm and being operationally engaged to the mallet, such that the motor is positioned for selectively rotating the mallet relative to the standing bell, wherein the mallet is configured for exciting continuous vibrations in the standing bell, such that a continuous note is produced, the motor being engaged to the arm and positioned in the interior space, such that a shaft of the motor extends from the arm toward the base, and such that the shaft is axially positioned relative to the ring;
   a bar engaged to and extending bidirectionally from the shaft, the mallet being hingedly engaged to a first end of the bar;
   a tensioner engaged to and extending between the mallet and a second end of the bar, such that the tensioner is positioned for biasing the mallet for frictionally contacting the rim of the standing bell, the tensioner comprising a spring;
   a power module positioned in the interior space and being engaged to one or both of the base and the arm, the power module being operationally engaged to the motor, such that the power module is positioned for selectively powering the motor, the power module comprising a battery, the battery being rechargeable;
   a port engaged to the arm or the base and being operationally engaged to the battery, wherein the port is configured for engaging a plug of a charging cord for operationally engaging the battery to a source of electrical current for charging the battery and powering the motor;
   an aperture positioned in the base or the arm and being positioned proximate to the battery, wherein the aperture is configured for accessing the interior space for servicing the battery;
   a panel selectively engageable to the base or the arm for closing the aperture;
   a controller engaged to the base or the arm and being operationally engaged to the motor and the power module, such that the controller is positioned for regulating a rotational speed of the mallet; and
   a switch engaged to the base or the arm and being operationally engaged to the controller and the power module, wherein the switch is configured for being selectively switched for operationally engaging the controller to the power module.

* * * * *